United States Patent [19]

Stewart et al.

[11] Patent Number: 4,828,365
[45] Date of Patent: May 9, 1989

[54] MULTICOLOR FILTER FOR PRODUCING PURER WHITE ACROSS A DISPLAY DEVICE

[75] Inventors: Roger G. Stewart, Neshanic Station; Alfred C. Ipri, Princeton, both of N.J.

[73] Assignee: RCA Licensing Corporation, Princeton, N.J.

[21] Appl. No.: 158,954

[22] Filed: Feb. 22, 1988

[51] Int. Cl.⁴ ............................ G02F 1/13; G02B 5/22
[52] U.S. Cl. ................................. 350/339 F; 350/317
[58] Field of Search ...................... 340/702, 703, 793; 350/339 F, 317

[56] References Cited

U.S. PATENT DOCUMENTS

| | | | |
|---|---|---|---|
| 2,802,964 | 7/1954 | Testy | 340/703 |
| 4,410,887 | 10/1983 | Stolov et al. | 350/330 X |
| 4,506,956 | 3/1985 | Dir | 350/339 F |
| 4,593,978 | 7/1986 | Mourey et al. | 350/339 F |
| 4,600,274 | 7/1986 | Morozumi | 350/339 F |
| 4,642,619 | 2/1987 | Togashi | 340/703 X |

*Primary Examiner*—Stanley D. Miller
*Assistant Examiner*—Anita E. Pellman
*Attorney, Agent, or Firm*—E. M. Whitacre; D. H. Irlbeck; L. L. Hallacher

[57] ABSTRACT

A multicolor filter for a display device includes separate filter elements for individually providing the primary colors of light. The areas of the filter elements are tailored in accordance with the percentages of primary light colors in pure white light, the percentages of primary light in the illuminating source, and the light transmission capabilities of the filter elements. Additionally, the filter elements are configured so that the centroid of the filter elements are within the close proximity of a straight line passing through adjacent filter elements.

6 Claims, 2 Drawing Sheets

MULTICOLOR FILTER FOR PRODUCING PURER WHITE ACROSS A DISPLAY DEVICE

BACKGROUND

This invention relates generally to filters for display devices and particularly to a multicolor filter for producing purer white and for establishing uniform brightness across a display device, such as a liquid crystal display.

As is known to those skilled in the art, many display devices produce color images by passing light through filters which transmit the color of light desired for the display while filtering out other colors of light. In such devices, the color is produced by the filters rather than the elements themselves. An example of such a display device is a liquid crystal display. In liquid crystal displays, the liquid crystals are voltage actuated to change their light transmission, or reflective, capabilities to produce the desired image. As used herein, the term "transmission capabilities" also includes reflection capabilities. However, the crystals themselves do not display any color characteristics. Accordingly, when a color display is desired each crystal must be associated with an appropriate filter to produce the desired color of light. Typically, in display devices the three primary colors of red, green and blue are produced using filters, and other colors are produced by appropriately combining the various primary colors to produce the desired color. An ideal display must produce white, and for such a display the three primary colors must be produced with the proper balance of brightnesses. However, because the various colors are provided by the use of different filters, and because the filters are necessarily made of different materials, the light transmission characteristics of the three filters are different, making it extremely difficult to achieve the brightness balance needed to produce white light. In the absence of such balance the white portion of the image is tined, with the tint determined by the color filter which has the greatest light transmission capability. Typically, the color balance required for achieving white can only be obtained by lowering the transmission efficiencies of the higher transmission capability filters to substantially match the efficiency of the filter having the lowest transmission efficiency. Accordingly, for such a display the maximum brightness is determined by the transmission capability of the most inefficient color filter. This detrimentally decreases the brightness of the display produced by the display device.

In many types of liquid crystal displays the illumination is provided by backlighting the crystals. Efficiency of operation suggests that the most efficient light source be used for each backlighting. However, typically the most efficient light sources produce a high proportion of one primary color and the white light has a tint determined by that primary color. This characteristic also makes it difficult to produce flesh tones, and other colors, with a liquid crystal display. For these reasons there is a need for a multicolor filter for producing maximum and uniform brightness across a display device and for compensating for color imbalances of the illumination source. The present invention fulfills these needs.

SUMMARY

A multicolor filter for a display device includes a plurality of filter elements for providing the primary light colors. Each of the filter elements has an area tailored in accordance with the percentages of primary light colors in pure white light, the actual percentages of primary light colors in the illumination-source, and a compensated transmission factor related to the light transmission capabilities of the filter elements.

DETAILED DESCRIPTION

Figures 1, 2:
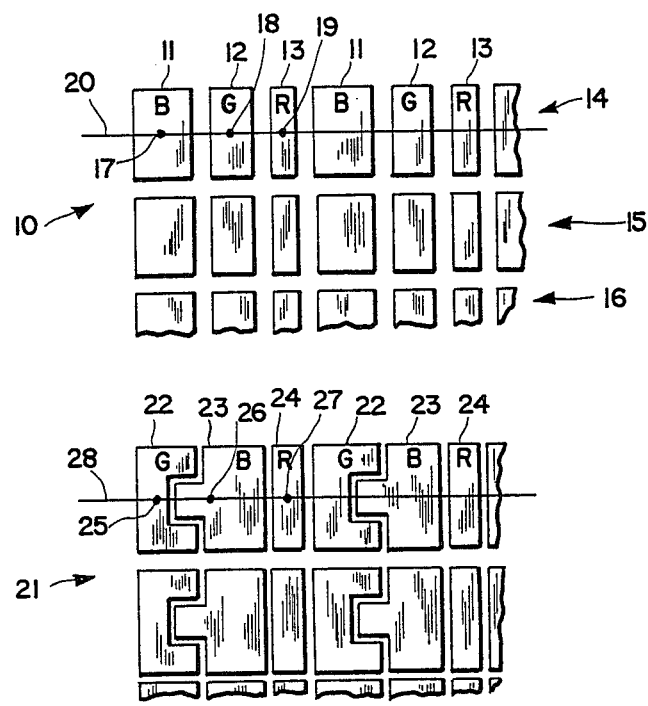
FIG. 1 is a preferred embodiment of a multicolor filter for a display device.
FIG. 2 is another preferred embodiment of a multicolor filter for a display device.

FIG. 1 shows a filter 10 having a plurality of filter elements 11, 12 and 13 arranged horizontally in rows 14, 15 and 16. The filter elements 11, 12 and 13 are composed of various materials which efficiently transmit the three primary colors of light, blue, green and red, respectively, as indicated by the letters B, G, R in each of the three filter elements. Because the light transmission capability of the filter elements 11, 12 and 13 typically are different for a given brightness of back illumination each of the three color filters will display a different brightness in accordance with the transmission capabilities of each of the individual filter elements. In a typical display device the most efficient light transmission capability material will dominate, and any effort to produce white light by combining the three primary colors of light will result in the white having a tint which is determined by the most efficient light transmitting material. In FIG. 1, such a tint is avoided by inversely portioning the area of the three color elements 11, 12 and 13 in accordance with their light transmitting capabilities. Thus, as shown in FIG. 1, each of the three filter elements 11, 12 and 13 has substantially the same vertical dimension. However, the horizontal dimension is varied to thereby change the area of the three elements 11, 12 and 13. The change in area is determined by the light transmission capability of the elements so that the ratio of the light transmission capability to the area for each of the three elements is substantially the same for all elements, thus, $T_x/A = K$ where:

$T_x$ = light transmisson capability
$A$ = area
$K$ = a constant.

By dimensioning the filter elements such that the areas A and light transmission capabilities $T_x$ satisfy the constant K ratio, for a given brightness of illumination each filter transmits substantially the same illumination brightness.

The tailoring of the filter element areas described above is very effective in producing pure white light on the screen of a display device where the illuminating source produces pure white light. The typical light source does not provide pure white light; and the most efficient sources, i.e. those providing the most light for the least energy expenditure, do not. For light sources of this type, pure white light can be produced on the screen of the display device by measuring the brightness of the three primary colors emitted by the illumination source and by inversely tailoring the areas of the filter elements in accordance with the measurements. Thus, assuming that blue is the maximum brightness, and that green and red, respectively are 90% and 80% of the blue level, the overall display brightness can be made more uniform by respectively increasing the green and red filter areas. Thus, AG (area green)=AB(area blue)/0.9 and AR (area red)=AB/0.8. For a particular model of illumination source the emission percentages are substantially constant and a pure white is achieved when a new illumination source of the same model is used to replace the original source. The color emission percentages given above are arbitrarily chosen for purposes of illustration and may vary considerably for each type of illumination source.

Initially, it seems that one can either use a pure white light source and adjust the filter element areas in accordance with the transmission efficiencies, or adjust only the filter element areas for the various primary light percentages of an impure light source. Actually, it is possible to adjust for both of the imbalances. Such adjustment is achieved by tailoring the filter element areas in accordance with the percentages of red, green and blue light in pure white light, as well as the actual percentages of red, green and blue light in the light source, along with a compensated transmission factor, as follows:

$$A = \frac{1}{3} \frac{PWP}{(AP)(CTF)} \quad (1)$$

where:
A = Compensated area for a particular color element
PWP = Percentages of the color in pure white light
AP = Actual percentage of the color in the light source
CTF = Compensated transmisson factor.

EXAMPLE

By definition pure white light includes 50% green, 40% red and 10% blue light. Assume a light having 45% green, 25% red and 30% blue light. Also assume transmission efficiencies of 80% green, 75% red and 50% blue. The compensated transmission factors (CTF) for each color is obtained by dividing the actual transmission efficiency for each color by the average for the three colors. Thus the CTF's for green, red and blue respectively are 1.17, 1.10 and 0.73.

Thus, using equation (1) for compensated area A above, the filter element areas are adjusted such that, for each triad of the screen, green is 33%, red is 50% and blue is 17% of the total triad area. The adjustment technique can also accommodate for other sources of light imbalance. For example, a liquid crystal device includes transparent electrical conductors. Frequently, such conductors transmit light with a faint red tint. This affect can be offset by including it in the red light transmission percentage, prior to making the area calculations. The above light percentages of the light source and the transmission efficiencies are arbitrarily chosen for the example.

In FIG. 1, the rows 14, 15 and 16 preferably are arranged so that the filter elements 11, 12 and 13 are vertically aligned in columns. Additionally, the sequence of colors for the three elements 11, 12 and 13 is the same for each of the rows. However, all the filter elements within a particular column need not be the same color. The configuration of the filter elements 11, 12 and 13 are rectangular and accordingly the centroids 17, 18 and 19 of the filter elements 11, 12 and 13, respectively, lie along a horizontal line 20 which passes through adjacent filter elements.

FIG. 2 shows a filter 21 including filter elements 22, 23 and 24 which efficiently transmit green, blue and red light respectively. The filter elements 22, 23 and 24 are dimensionally tailored and configured in accordance with the percentages of the primary light colors in the illumination source, the compensated transmission factors of the filter elements and the percentages of primary colors in pure white light in accordance with equation (1) above. The filter elements 22, 23 and 24 are configured whereby the centroids 25, 26 and 27, respectively, lie in the close proximity of a horizontal line 28 which passes through the adjacent filter elements. The configurations are selected such that the centroids 25, 26 and 27 are substantially centered vertically within the filter elements, but are not necessarily horizontally centered, as demonstrated by the centroids 25 and 26 of the filter elements 22 and 23, respectively.

Figure 3:
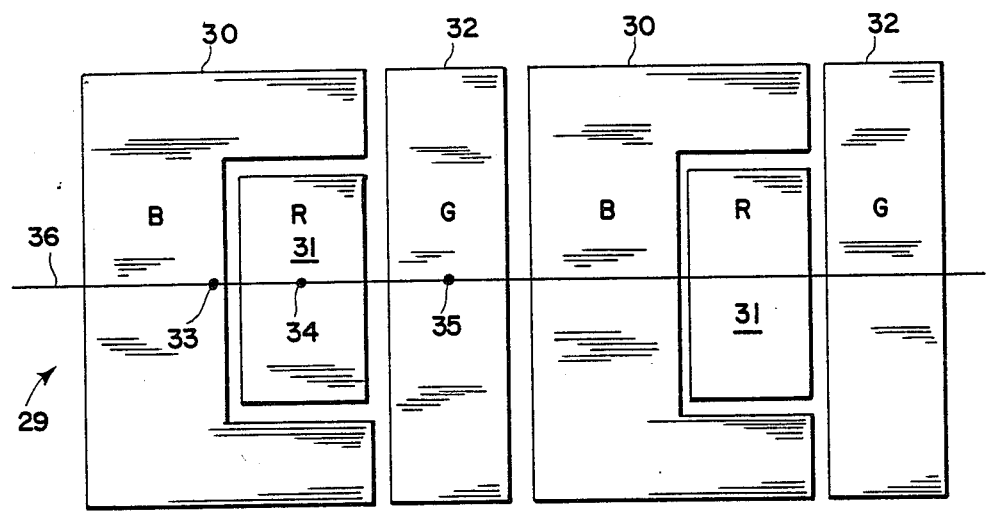
FIG. 3 is still another preferred embodiment of a multicolor filter for a display device.

FIG. 3 is another preferred embodiment of a multicolored filter 29 having filter elements 30, 31 and 32 which respectively efficiently pass blue, red and green light. The filter elements 30, 31 and 32 also are dimensioned and configured in accordance with equation (1). Additionally, the centroids 33, 34 and 35 of the filter elements 30, 31 and 32, repectively, preferably are vertically centered but need not necessarily be horizontally centered, as demonstrated by the centroid 33 of the blue element 30. The centroids 33, 34 and 35 lie in the close proximity of a horizontal line 36, which passes through the filter elements 30, 31 and 32.

The red, blue and green filter elements for each of the embodiments of FIGS. 1, 2 and 3 are arranged in triads so that each of the triads includes one filter element for each of the primary colors. For this reason, each of the triads is capable of efficiently producing a substantially pure white light when all three liquid crystals associated with the various filter elements are equally illuminated. Additionally, because the centroids of the filter elements lie in the close proximity of a straight line passing through adjacent filter elements, the mixing of the light passing through adjacent elements of a particular triad is more uniformly balanced and results in a purer non-primary color, or white when white is produced. The centroid alignment also substantially reduces color artifacts. These features are particularly advantageous when flesh tones are to be produced.

The manner in which the various filter elements are associated within the liquid crystals of a display device, and the manner in which the liquid crystals are electrically interconnected and electrically driven are within the purview of one skilled in the art and not within the scope of the present invention. However, the electrical conductors which drive the crystals are routed to configure the liquid crystals congruently to the configuration and dimensions of the filter elements. For example, U.S. Pat. No. 4,410,887 shows several colors of filters in a liquid crystal display device.

What is claimed is:
1. A multicolor filter for a display device illuminated by a light source comprising:
a plurality of filter elements for providing the primary light colors, each of said filter elements having an area tailored in accordance with the percentages of primary light colors in pure white light, the actual percentages of primary light colors in said light source, and a compensated transmission factor related to the light transmission capabilities of said filter elements.

2. The filter of claim 1 wherein said filter element areas are selected in accordance with the expression:

$$A = \frac{PWP}{3(AP)(CTF)}$$

where:
- A = Compensated area of a particular color filter element
- PWP = Percentage of a color in pure white light
- AP = Actual percentage of the color in the light source
- CTF = Compensated transmission factor of the filter element; the CTF for each color is the actual transmission efficiency of that color divided by the average transmission efficiency for all the colors.

3. The filter of claim 2 wherein said filter elements are arranged in triads and are configured wherein the centroids of filter elements in each triad and in adjacent triads lie in the proximity of a straight line passing through adjacent filter elements.

4. The filter of claim 1 wherein said filter elements are arranged in triads and are configured wherein the centroids of filter elements in each triad and in adjacent triads lie in the proximity of a straight line passing through adjacent filter elements.

5. The filter of claim 1 wherein each of said filter elements has an individual light transmission capability and an area selected wherein the ratio of the light transmission capabilities and the areas for each of said filter elements is substantially the same.

6. The filter of claim 5 wherein said filter elements are arranged in triads and are configured wherein the centroids of filter elements in each triad and in adjacent triads lie in the proximity of a straight line passing through adjacent filter elements.

* * * * *